United States Patent
Thompson et al.

(10) Patent No.: US 10,387,779 B2
(45) Date of Patent: Aug. 20, 2019

(54) SYSTEMS AND METHODS FOR MULTI-OBJECTIVE EVOLUTIONARY ALGORITHMS WITH SOFT CONSTRAINTS

(71) Applicant: THE AEROSPACE CORPORATION, El Segundo, CA (US)

(72) Inventors: Timothy Guy Thompson, Purcellville, VA (US); Matthew Phillip Ferringer, Round Hill, VA (US)

(73) Assignee: The Aerospace Corporation, El Segundo, CA (US)

( * ) Notice: Subject to any disclaimer, the term of this patent is extended or adjusted under 35 U.S.C. 154(b) by 739 days.

(21) Appl. No.: 14/963,870

(22) Filed: Dec. 9, 2015

(65) Prior Publication Data

US 2017/0169353 A1  Jun. 15, 2017

(51) Int. Cl.
*G06N 3/12* (2006.01)
*G06N 3/08* (2006.01)

(52) U.S. Cl.
CPC ............. *G06N 3/126* (2013.01); *G06N 3/086* (2013.01)

(58) Field of Classification Search
CPC .............................. G06N 3/126; G06N 3/086
See application file for complete search history.

(56) References Cited

U.S. PATENT DOCUMENTS

| | | | |
|---|---|---|---|
| 5,255,345 A | 10/1993 | Shaefer | |
| 5,319,781 A * | 6/1994 | Syswerda | G06N 3/126 705/7.25 |
| 5,568,500 A | 10/1996 | Furuya et al. | |
| 6,532,076 B1 | 3/2003 | Sidorowich | |
| 6,662,167 B1 * | 12/2003 | Xiao | G06N 3/126 706/12 |
| 6,941,287 B1 | 9/2005 | Vaidyanathan et al. | |
| 7,835,929 B2 | 11/2010 | Bennett | |
| 7,996,344 B1 | 8/2011 | Goel | |
| 8,069,127 B2 | 11/2011 | Taylor et al. | |
| 8,255,344 B2 | 8/2012 | Ferringer et al. | |

(Continued)

FOREIGN PATENT DOCUMENTS

WO  WO2010132804 A1  11/2010

OTHER PUBLICATIONS

Abraham, Andrew, "Particle Swarm Optimization of Low-Thrust, Geocentric-to-Halo-Orbit Transfers," May 2014, Thesis and Dissertation, Lehigh University, 202 pages.

(Continued)

*Primary Examiner* — Scott A. Waldron
*Assistant Examiner* — Casey R. Garner
(74) *Attorney, Agent, or Firm* — Lee & Hayes

(57) ABSTRACT

Systems and methods are provided to engage in multi-objective optimization where there may be one or more constraints. At least one of the constraints may be soft constraints, such that if a potential solution to the multi-objective optimization problem violates only soft constraint(s), then that potential solution may be allowed to persist in a population of potential solutions that may be used to propagate child potential solutions. Potential solutions that violate soft constraints may be tested for non-domination sorting against other potential solutions that violate soft constraints and based at least in part on values associated with the soft constraint violations.

20 Claims, 8 Drawing Sheets

(56) References Cited

U.S. PATENT DOCUMENTS

| | | | |
|---|---|---|---|
| 8,255,345 | B2 | 8/2012 | Ferringer et al. |
| 8,285,653 | B2 | 10/2012 | Ferringer et al. |
| 8,433,662 | B2 | 4/2013 | Ferringer et al. |
| 8,494,988 | B2 | 7/2013 | Ferringer et al. |
| 8,498,952 | B2 | 7/2013 | Ferringer et al. |
| 8,504,496 | B2 | 8/2013 | Ferringer et al. |
| 8,560,472 | B2 | 10/2013 | Ferringer et al. |
| 8,862,627 | B2 | 10/2014 | Ferringer et al. |
| 9,189,733 | B2 | 11/2015 | Thompson et al. |
| 9,321,544 | B2 | 4/2016 | Thompson et al. |
| 2002/0013776 | A1 | 1/2002 | Kishi |
| 2005/0187846 | A1 | 8/2005 | Subbu et al. |
| 2007/0005522 | A1* | 1/2007 | Wren ................ G06N 3/126 706/13 |
| 2008/0010044 | A1 | 1/2008 | Ruetsch |
| 2008/0094250 | A1 | 4/2008 | Myr |
| 2008/0215512 | A1 | 9/2008 | Narzisi et al. |
| 2008/0234944 | A1 | 9/2008 | Schaffer et al. |
| 2008/0241839 | A1 | 10/2008 | Potkin et al. |
| 2009/0313191 | A1 | 12/2009 | Yao et al. |
| 2010/0040281 | A1 | 2/2010 | Chen et al. |
| 2010/0046806 | A1 | 2/2010 | Baughman et al. |
| 2010/0292929 | A1 | 11/2010 | Ferringer et al. |
| 2010/0293120 | A1 | 11/2010 | Ferringer et al. |
| 2010/0293122 | A1 | 11/2010 | Ferringer et al. |
| 2010/0293313 | A1 | 11/2010 | Ferringer et al. |
| 2011/0078100 | A1 | 3/2011 | Goel |
| 2011/0231320 | A1 | 9/2011 | Irving |
| 2011/0276527 | A1 | 11/2011 | Pitcher et al. |
| 2012/0029965 | A1 | 2/2012 | Steffen et al. |
| 2012/0063590 | A1 | 3/2012 | Dortschy et al. |
| 2012/0084314 | A1 | 4/2012 | Ferringer et al. |
| 2013/0024395 | A1 | 1/2013 | Clark et al. |
| 2013/0054045 | A1 | 2/2013 | Ramezani et al. |
| 2013/0132042 | A1* | 5/2013 | Chan ................ G06F 17/50 703/1 |
| 2013/0218526 | A1 | 8/2013 | Lev et al. |
| 2014/0278695 | A1 | 9/2014 | Smith |
| 2015/0161629 | A1 | 6/2015 | Verma |
| 2017/0011292 | A1 | 1/2017 | Thompson |
| 2017/0068890 | A1 | 3/2017 | Thompson |
| 2017/0293839 | A1 | 10/2017 | Thompson et al. |
| 2017/0364812 | A1 | 12/2017 | Thompson et al. |
| 2018/0082198 | A1 | 3/2018 | Thompson et al. |
| 2018/0082209 | A1 | 3/2018 | Thompson |

OTHER PUBLICATIONS

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common. Environment"; 2000; IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries. psu.edu/lheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi-objective Optimization (VIDEO)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Instiiute of Technology; Evolutionary Computation 10(3); pp. 1-21.

Lorenz, Edward, "Predictability: A Problem Partly Solved," 1996, In Proc. Seminar on Predictability, vol. 1, No. 1, 18 pages.

Mackey et al, "Oscillation and Chaos in Physiological Control Systems," Jul. 15, 2977, Science. 197(4300): 287-289.

Muhlenbein et al.; "Evolution in time and space—the parallel genetic algorithm."; 1991; Morgan Kaufmann; pp. 1-22.

Office Action for U.S. Appl. No. 13/837,782, dated Jan. 15, 2015, Smith et al., "Systems and Methods for Prioritizing Funding of Projects", 21 pages.

Office Action for U.S. Appl. No. 13/837,782, dated Oct. 20, 2016, Smith et al., "Systems and Methods for Prioritizing Funding of Projects", 16 pages.

Office Action for U.S. Appl. No. 13/837,782, dated Mar. 30, 2017, Smith et al., "Systems and Methods for Prioritizing Funding of Projects", 20 pages.

Office Action for U.S. Appl. No. 13/837,782, dated Apr. 7, 2016, Smith et al., "Systems and Methods for Prioritizing Funding of Projects", 14 pages.

Office action for U.S. Appl. No. 14/796,299, dated Jun. 19, 2018, Thompson, "Systems and Methods for Multi Objective Evolutionary Algorithms with Category Discovery", 22 pages.

(56) References Cited

OTHER PUBLICATIONS

Office action for U.S. Appl. No. 14/847,424, dated Jun. 28, 2018, Thompson, "Systems and Methods for Multi Objective Optimizations with Live Updates", 24 pages.
Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Srinivas et al., "Multiobjective Optimization Using Nondominated Sorting in Genetic Algorithms," 1994. Evolutionary Computation, 2(3): 221-248.
Stodgell et al., "Satellite Rendezvous Tours Using Multiobjective Evolutionary Optimization."Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.
Subbu, et. al., "Management of Complex Dynamic Systems based on Model-Predictive Mutli-objective Optimization", IEEE International Conference on Computational Intelligence for Measurement Systems and Applications, Jul. 2006, pages.
Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Tang, Yong, "Advancing Hydrologic Model Evaluation and Identification Using Multiobjective Calibration Sensitivity Analysis and Parallel Computation." ProQuest Information and Learning Company. 2007, 48 pages.
Tang et al., "Parallelization Strategies for Rapid and Robust Evolutionary Multiobjective Optimization in Water Resources Applications." Advances in Water Resources. 2006, 1-39.
Van Veldhuizen et al., "Considerations in Engineering Parallel Multiobjective Evolutionary Algorithms." IEEE Transactions on Evolutionary Computation. vol. 7, No. 2, Apr. 2003. 144-173.
Van Veldhuizen et al., "(Final Draft) TR-98-03 Multiobjective Evolutionary Algorithm Research: A History and Analysis" Oct. 14, 1998; pp. 1-30.
Ventura et al.; "JCLEC: a Java framework for evolutionary computation"; 2007; Springer-Verlag; pp. 381-392.
Zimmer et al., "Utilizing Evolutionary Algorithms for Problems with Vast Infeasible Regions and Expensive Function Evaluations.". The Aerospace Corporation. Jun. 27, 2008, 12 pages.
Chootinan et al, "Constraint Handling in Genetic Algorithms Using a Gradient-Based Repair Method," Mar. 14, 2005, Computers & Operations Research, 33: 2263-2281.
Dauphin et al, "Identifying and Attacking the Saddle Point Problem in High-Diminesional Non-Convex Optimization," 2014, In Advances in Neural Information Processing Systems, vol. 27, 9 pages.
Farmani et al, "Self-Adaptive Fitness Formulation for Constrained Optimization", Oct. 2003, IEEE Transactions on Evolutionary Computation, 7(5):445-455.
Ishibuchi et al, "A Multi-Objective Genetic Local Search Algorithm and Its Application to Flowshop Scheduling," Aug. 1998, IEEE Transactions on Systems, Man, and Cybernetics—Part C: Applications and Reviews, 28(3): 392-403.
Office Action dated Apr. 26, 2019 for U.S. Appl. No. 15/268,840 "Systems and Methods for Multi-Objective Optimizations with Decision Variable Perturbations" Thompson, 23 pages.
Kukkonen et al, "Ranking-Dominance and Many-Objective Optimization," Sep. 25, 2007, IEEE Congress on Evolutionary Computation, pp. 3983-3990.
Office Action for U.S. Appl. No. 15/267,528, dated Apr. 16, 2019, Timothy Guy Thompson,"Systems and Methods for Multi-Objective Optimizations with Objective Space Mapping", 25 pages.
Office Action for U.S. Appl. No. 14/847,424, dated Apr. 19, 2019, Timothy Guy Thompson, "Systems and Methods for Multi-Objective Optimizations with Live Updates", 19 pages.
Patel et al., "Fast Mesh-Sorting in Multi-objective Optimization," 2015, Int'l Federation of Automatic Control (IFAC-PapersOnLine) 48(8), pp. 936-941.
Sorensen, "Route stability in vehicle routing decisions: a bi-objective approach using metaheuristics", Central European Journal of Operations Research, 2006, pp. 193-207.
Office Action for U.S. Appl. No. 14/796,299 dated Jan. 23, 2019, Thompson et al., "Systems and Methods for Multi-Objective Evolutionary Algorithms with Category Discovery," 15 pages.
Office Action for U.S. Appl. No. 15/094,521, dated Nov. 29, 2018, Thompson et al, "Systems and Methods for Multi-Objective Heuristics with Conditional Genes", 26 pages.

\* cited by examiner

SYSTEMS AND METHODS FOR MULTI-OBJECTIVE EVOLUTIONARY ALGORITHMS WITH SOFT CONSTRAINTS

FIELD OF THE DISCLOSURE

Aspects of the disclosure are related generally to multi-objective evolutionary algorithms, and more particularly to systems and methods incorporating soft constraints in performing multi-objective evolutionary algorithms.

BACKGROUND OF THE DISCLOSURE

Large-scale value-based non-linear models often require large numbers of decision variables and constraints (e.g., over a million), potentially with vastly infeasible search spaces (e.g., discovery of feasible decision variable sets without a vastly infeasible search space mechanism may be relatively difficult or impossible). Multi-objective Evolutionary Algorithms (MOEA) may fail when they have such a large number of decision variables and constraints. Often times in these MOEA, the computational bandwidth needed to evaluate whether a potential solution violates a constraint may be relatively high. In some cases, determining whether potential solutions violate constraints may require similar or even more computational bandwidth than evaluations of potential solutions on the basis of one or more objectives. In many cases, there may be oceans of unfeasible space in the objective hyper-dimensional space. These large oceans of unfeasible space can sometimes pose particular difficulty in converging to multi-objective optimized solutions.

BRIEF DESCRIPTION OF THE DRAWINGS

Reference will now be made to the accompanying drawings, which are not necessarily drawn to scale, and wherein.

DETAILED DESCRIPTION

Figure 1:
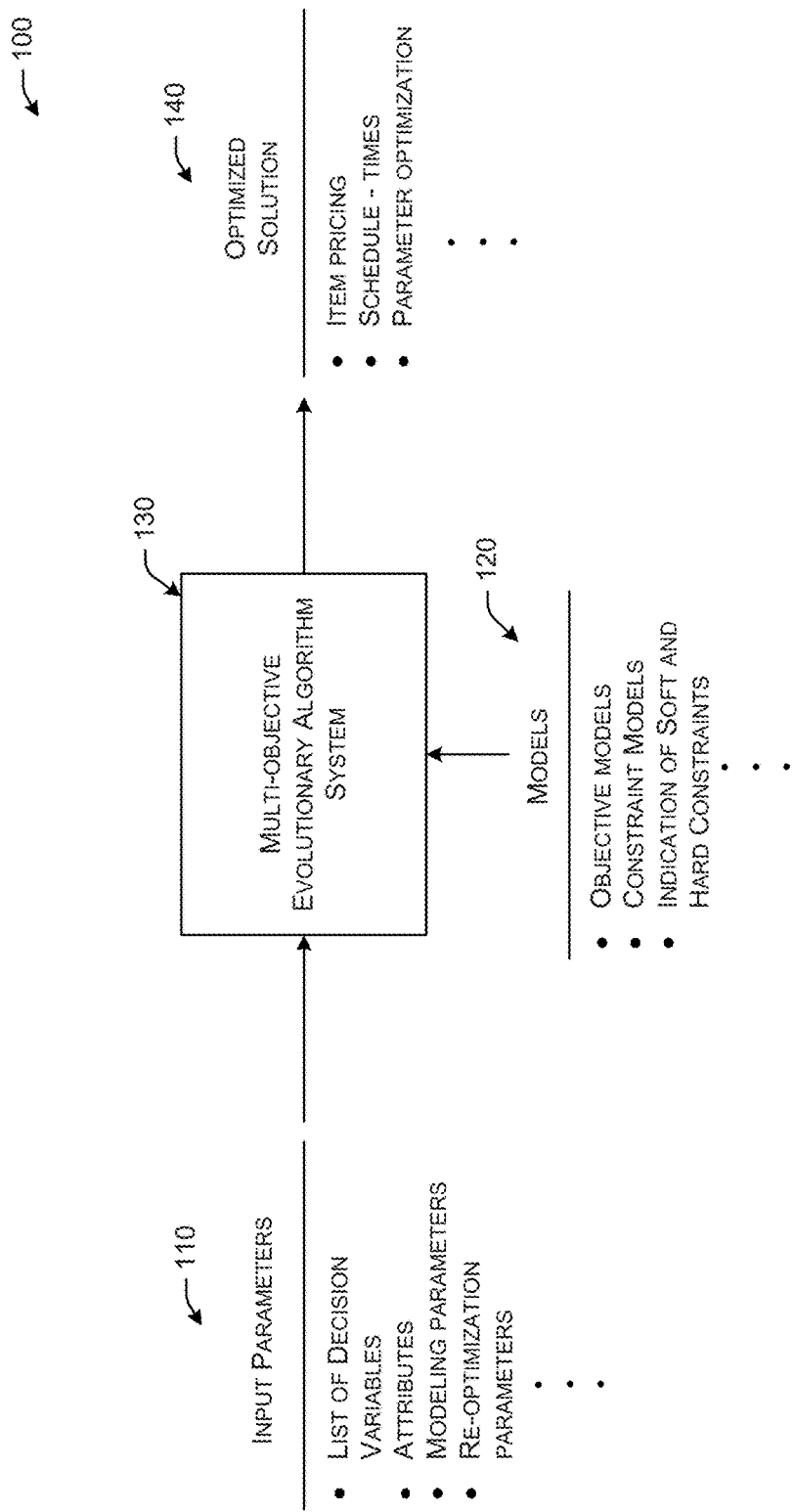
FIG. 1 is a schematic diagram that illustrates an example environment with input parameters and optimized solutions based on one or more objective models and/or constraint models of a multi-objective evolutionary algorithm (MOEA) system, in accordance with embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a multi-objective evolutionary algorithm system (MOEAs) configured to perform multi-objective evolutionary algorithms. Evolutionary algorithms have been described in a variety of other publications including commonly owned U.S. patent application Ser. No. 12/550,858, filed on May 12, 2010 and titled "Systems and Methods for Generating Feasible Solutions form Two Parents for an Evolutionary Process," the contents of which, in its entirety, is incorporated herein by reference.

In example embodiments, multi-objective evolutionary algorithms may be performed to find solutions to highly constraint problems, such as scheduling flights of a major airline, pricing freight services of a major train network, optimizing manufacturing parameters of complex microelectronics manufacturing processes, or the like. The solutions to these problems may be evaluated according to a plurality of objectives. For example, for scheduling flights in an airline network, the multiple objectives may include airline profits, fuel consumption, customer satisfaction metrics, accumulated airport delays, or the like. Optimized solutions may be determined by employing evolutionary processes, such as selection, crossover, and mutations. In example embodiments, evolutionary operators may be used to generate new candidate solutions for the multi-objective optimization. The decision variables may be organized as a data array that resembles a chromosome. These chromosomes, or solutions, may be propagated by the various evolutionary operators (e.g., child chromosomes may be generated from parent chromosomes). The chromosomes at each generation may be checked for both feasibility and multi-objective performance. Feasibility may pertain to whether the potential chromosome is viable and/or if the solution associated with the chromosome can physically be implemented. Feasibility of a chromosome representing a potential solution may be checked by applying the chromosome to one or more constraint models to determine if the chromosome violates one or more constraints. The chromosomes may further be evaluated according to one or more objective models that may indicate the multiple objective values for which the optimization is being performed.

In example embodiments of the disclosure, the multi-objective evolutionary algorithms, as performed by the methods and systems disclosed herein may be applied to any variety of optimization problems with any suitable number of constraints and/or objectives. The systems and methods, as disclosed herein, may generate an optimized solution or a set of pareto-optimized solutions (e.g., solutions that are non-dominated by any other solution) that may be implemented by a requester of the multi-objective optimization. For the purposes of this disclosure, a non-dominated solution may be a solution that is better than any previous solution with regards to at least one objective and no worse with regards to all objectives.

As a non-limiting example of MOEA optimization, multi-objective optimization may be performed for scheduling flights of a major airline that serves airports around the world. The optimization may be for scheduling flights. Constraint models may indicate if a schedule is not feasible (e.g., flights do not have enough ground time for refueling and/or cleaning). Thus schedules that are not feasible may not be presented as optimized solutions for implementation. Potential solutions, in the form of chromosomes, may also be evaluated based on a number of objectives using objective models related to each of those objectives. In this non-limiting example of the airline network, the multiple objectives may include profit, accumulated delays at each airport, equipment utilization, return on investment, and one or more customer satisfaction metrics.

In example embodiments of the disclosure, parent chromosomes may be used to generate a population of candidate solutions. The parent chromosomes may be subjected to selection processes, where the parent chromosome may be selected for evolutionary operations such as crossover and mutation. Additionally, chromosomes (e.g., parent chromosomes and child chromosomes) may be subject to non-domination testing to identify non-dominated chromosomes (e.g., potential solutions) that may be propagated to future generations due to their potential in being and/or producing offspring that may be a pareto-optimized solution.

In these example embodiments, as discussed above, the optimization process may be performed by heuristic mechanisms that emulate biological processes (e.g., cross-over, mutation, etc.) on populations that may be optimized for feasibility or constraint minimization or elimination of constraints of the potential solutions being evaluated based on performance metrics determined using objective models. The process of generating or selecting potential solution that are feasible or at least minimally constrained may be performed by heuristic mechanisms that involve an iterative allocation and constraint evaluation of potential solutions to the multi-objective problem. The determination of feasibility may be performed by subjecting the potential solutions (e.g., chromosomes) that make up the potential solution population to one or more constraint models to determine if each of the potential solutions indicate a constraint violation. In example embodiments, there may be a plurality of constraint models, where each of the constraint models pertain to a particular constraint violation. In these embodiments, some of the constraints may be deemed and/or designated as soft constraints and the other of the constraints may be deemed hard constraints. In this way, a chromosome that is tested for feasibility may be determined to be one of feasible, soft infeasible, or hard infeasible. A chromosome that has no constraints may be determined to be feasible. A chromosome that triggers only soft constraint violations may be determined to be soft infeasible. A chromosome that triggers at least one hard constraint may be determined to be hard infeasible. In example embodiments, the feasibility of various chromosomes may be determined at one or more slave processors that cooperate with one or more master processors, on which the primary multi-objective evolutionary algorithm is controlled and/or performed.

In example embodiments, the feasible chromosomes may be persistent. This means that the feasible chromosomes, as long as they are deemed to be of relatively high quality, as determined from their objective values, may be allowed to propagate from one generation to the next. In this way, the feasible chromosomes are allowed to stay in the population as long as their genetic material is likely to drive child solutions to greater levels of fitness or multi-objective performance. In example embodiments, the soft constraint chromosomes may be partially persistent. The soft constraint chromosomes may be allowed to stay in the population for a limited number of generations or as long as their genetic material are likely to produce offspring that drive to increasingly better multi-objective performance. In example embodiments, the soft infeasible chromosomes may be indicated, such as in metadata associated with the soft constraint, to be soft infeasible. In example embodiments, the soft infeasible chromosomes may also be marked, such as in metadata associated with the soft chromosome, with a lifetime, such as a number of generations that the soft infeasible solutions may remain in the population. In example embodiments, setting this lifetime may ensure that soft infeasible solutions may ultimately be culled out of the population based on the weakness of their adherence to constraints, no matter how strong their constituent genetic qualities may be from a multi-objective perspective. Hard infeasible chromosomes, in example embodiments, may be allowed to participate in non-domination testing and/or selection, but may not be persistent. This means that potential solutions displaying hard constraints may not be allowed to survive in the population past the current generation. It will be appreciated that if in the progression towards pareto-optimized solutions, relatively large oceans of infeasible space is to be traversed, then having soft-constraint solutions that are used to propagate child populations may lead to a pathway to travel through hard infeasible space, such as hard infeasible space in a hyper-dimensional objective space. It will also be appreciated that if there is immigration, relatively high levels of mutations, or otherwise an injection of new genetic material into the population, the ability to have soft constraints and soft infeasible chromosomes may allow the injected genetic material to persist in the population for a greater number of generations to potentially provide an avenue to drive to a feasible and more optimal solution.

In example embodiments, in genetic/evolutionary operators applied to soft infeasible, hard infeasible, and feasible chromosomes, there may be a preference for feasible chromosomes over soft infeasible chromosomes or hard infeasible chromosomes. Furthermore, there may be a preference for soft infeasible chromosomes over hard infeasible chromosomes. As a result, in a selection process and/or non-domination testing, a hard feasible chromosome may, in example embodiments, always win versus either a soft infeasible chromosome or a hard infeasible chromosome, regardless of objective value-based performance. Furthermore, a soft infeasible chromosome may always win versus an hard infeasible chromosome, regardless of constraint value and/or objective value-based performance of either of the chromosomes. In example embodiments, feasible and soft infeasible potential solutions (e.g., chromosomes) may be persistent, or in other words, soft infeasible and feasible chromosomes may survive from one generation to the next based at least in part on the multi-objective-based performance of those chromosomes, and may in example embodiments, be archived and, therefore, may persist from one run to the next. Hard infeasible chromosomes, on the other hand, while able to propagate from one generation to the next within a run, may not be allowed to persist in an archive between runs of a multi-objective optimization.

It will be appreciated that the application of the genetic operators as described above may, in example embodiments, allow the persistence and propagation of soft infeasible chromosomes that display relatively good performance from a multi-objective standpoint, even if those chromosomes are not completely feasible. In this way, good genetic material that may ultimately result in pareto-optimized solution by progressing through infeasible regions may be retained and/or propagated in the population of potential solutions. If a suitable number of feasible solutions are available, then the soft infeasible solutions may not live very long or persist for very many generations. However, if enough feasible chromosomes are not available, then part of the current generation population may have chromosomes that violate soft constraints. In example embodiments, the population that propagates from one generation to the next may include soft infeasible chromosomes. In other example embodiments, the population that propagates from one generation to the next may include only feasible chromosomes.

The systems and methods for handling infeasible chromosomes, by creating more than one category of infeasible solution may enable traversing through infeasible oceans and more efficiently and/or quickly reaching multi-objective pareto-optimized solutions. The systems and methods, as described herein, may still further enable greater persistence of certain infeasible chromosomes, particularly those that display relatively good objective performance, for the purposes of populating and propagating potential solutions. It will further be appreciated that in cases where there is "immigration," or otherwise an injection of new genetic material within the population, the new chromosomes carrying the new genetic material may be more persistent than it would otherwise be without the use of soft-constraints and deeming chromosomes soft infeasible. As a result, new chromosomes that may be injected to explore new regions of the multi-objective space may be more persistent by not being filtered out on the grounds of those new chromosomes violating one or more constraints when using the systems and methods, as described herein.

In example embodiments, the constraints associated with each of the infeasible, such as soft infeasible and/or hard infeasible chromosomes, may be quantified. In other words, there may be a quantitative measure of how much an hard infeasible or soft infeasible chromosome may be constraint on one or more constraint parameters. For example, suppose that a particular optimization problem has a two constraints, the first one a soft-constraint and the second one a hard-constraint. The model(s) associated with the first constraint may produce floating point quantitative results ranging from 0 to 10 and this first constraint may have a threshold value of 5, where 5 or greater may indicate a constraint violation and a value of less than 5 indicates a compliance with the constraint. The model(s) associated with the second constraint may produce BOOLEAN quantitative results of 0 or 1 and this second constraint may be such that a constraint value of 0 indicates no constraint violation and a constraint value of 1 indicates a constraint violation of the second constraint. Continuing with this example, a first chromosome may have constraint values of (first constraint=3.2, second constraint=0). This first chromosome may be determined to be feasible. A second chromosome may have constraint values of (first constraint=6.7, second constraint=0). This second chromosome may be determined to be soft infeasible. The constraint values of this second chromosome may be considered during the performance of other MOEA processes, such as selection and/or non-domination sorting. A third chromosome may have constraint values of (first constraint=2.8, second constraint=1). This third chromosome may be determined to be hard infeasible. The constraint values of this second chromosome may be considered during the performance of other MOEA processes, such as selection and/or non-domination sorting.

It will be appreciated that the multi-objective problem may be any suitable multi-objective problem. In example embodiments, the methods and systems, as described herein, may be suited for solving pricing optimization problems. In other example embodiments, the methods and systems, as described herein, may be suited for scheduling problems. In other example embodiments, the methods and systems, as described herein, may be suited for multi-parameter optimization. Indeed, in other example embodiments, the optimization problem to which the methods and systems described herein may be applied may be a combination of various elements, such as pricing, timing, and/or any other suitable control parameter(s).

In one non-limiting example, the systems and methods, as described herein, may be applied to optimizing the pricing of various hotel rooms that may be available to a hotel or chain of hotels. The pricing may be optimized within the constraints of offering the hotel rooms for rental. In this example, each of the various types of rooms (queen bed/facing the beach, two double beds/facing the pool, etc.) may be represented as decision variable or gene in a chromosome that is to be optimized in accordance to constraint model(s) and multiple objective models. The decision variables or genes of the chromosome may represent, for example the price of each of the types of hotel room. There may be a variety of objectives associated with this pricing optimization problem, such as, for example, maximizing profits, maximizing revenue, maximizing return on equity (ROI), minimizing unoccupied rooms at particular destinations, combinations thereof, or the like.

Still referring to the hotel room non-limiting example, there may be a variety of constraints associated with this pricing optimization problem, such as, for example, a maximum occupancy rate (e.g., 100%) for a particular type (e.g., downtown Detroit, double occupancy, queen bed, garden facing) of room, minimum occupancy rate (e.g., 70%) for a particular room type, etc. There may be a variety of constraint models available that may be invoked to determine the predicted occupancy of a room for particular dates in the future at various prices of the corresponding room types. In this example, the constraint models may be models that estimate the occupancy of a room type at various prices of that room type. Indeed, a chromosome having genes representing the price of various room types at some date in the future may be applied to the available constraint models to generate a predicted occupancy of a particular room type as a function of at least the price (e.g., gene or decision variable) of that room type. Those predicted occupancies may then be thresholded (e.g., thresholds of <70% or >100% in this example) to identify any constraint violations. For example, a constraint model may estimate that an available inventory of a particular room type may by 60% occupied at a particular price point. Therefore, if that room type item is allocated the category representing that price point, then the constraint model applied to that particular item may return an estimated 60% occupancy figure and may indicate that a constraint is violated for that room type, since the predicted occupancy is not at least 70%. particular price point. Therefore, if that room type item is allocated the category representing that price point, then the constraint model applied to that particular item may return an estimated 60% occupancy figure and may indicate that a constraint is violated for that room type, since the predicted occupancy is not at least 70%.

Continuing further with this non-limiting hotel pricing example, the minimum occupancy rate for each room type may be considered a soft-constraint and the maximum occupancy rate for each room type may be considered a hard-constraint. Although in this particular example, the choice of hard constraints and/or soft constraints may be based on physical realities (e.g., the maximum occupancy cannot exceed 100%), it will be appreciated that other optimization problems, and constraints thereof, may not be structured as this non-limiting example. For example, in other optimization problems, the maximum occupancy of each type of room may be a soft-constraint and the minimum occupancy rate may be considered a hard-constraint. With the minimum occupancy as a soft-constraint, if for particular chromosome a particular room is determined to be below a 70% projected occupancy and has no other constraint violations, then that chromosome may be deemed a soft infeasible chromosome. Furthermore, the minimum occupancy for the constraint violation may be identified for the chromosome, so that the chromosome may be compared to other soft infeasible chromosomes based on either or both of constraint violation values and/or multi-objective values.

It will be appreciated that the systems and methods, as described herein, may be configured, in example embodiments, for any variety of suitable optimization problems, including any variety of pricing optimization problem. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In example embodiments, the systems and methods, as described herein, may be particularly suited for solving relatively highly-constrained multi-objective pricing optimization problems.

It will further be appreciated that the systems and methods, as described herein, may be configured, in example embodiments, for any variety of parameter optimization problems. For example, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for solving relatively highly-constrained multi-objective manufacturing optimization problems.

It will still further be appreciated that the systems and methods, as described herein, may be configured, in example embodiments, to ascertaining trade-offs in the factor input space (e.g., decision variable space) of various production and/or services. For example, a consulting firm may apply the methods and systems described herein to identify if the types and volumes of consultancy services that may be offered to optimize the level of risk versus profit that may be assumed by the firm. In another example, a company may use the methods and systems, as described herein, to determine how many and of what training and experience of employees it should hire to meet one or more of its objectives.

FIG. 1 is a schematic diagram that illustrates example environment 100 with input parameters 110 and optimized solutions 140 based on one or more objective models and/or constraint models 120 of a multi-objective evolutionary algorithm (MOEA) system 130, in accordance with embodiments of the disclosure. While a particular configuration of the multi-tier MOEA system 130 is depicted herein, it will be appreciated that the configuration may vary depending on particular application of the multi-objective MOEA system 130, according to various embodiments of the disclosure. Indeed, there may be any variety of input parameters 110, models 120, system 130, and/or optimized solutions 140.

The input parameters 110 may be any suitable set of parameters, including, in example embodiments, a listing of decision variables and parameters for performing the MOEA optimization. For example, in the context of pricing hotel rooms, as discussed above, decision variables that may be organized as genes in a chromosome may represent prices of different types of hotel rooms that may be offered for rental. Attributes of the various decision variables may be provided, as part of input parameters 110, to the MOEA system 130. The attributes may include any variety of descriptors and/or parameters associated with a corresponding decision variable. These descriptors may be any variety of naming of the item or any type of parameters that may indicate any quality or naming of the decision variables. For example, in reference to the previous example of the hotel rooms, the attributes of the decision variables may include descriptors (e.g., type of hotel room). Such descriptors may include, for example, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular decision variables among more than one (e.g., many) decision variables. In further example embodiments, the input parameters 110 may further include parameters for operating the MOEA process, such as box-epsilon sizes and/or criteria for terminating the MOEA process. In yet further example embodiments, the input parameters may further include parameters and/or criteria for re-optimization. For example, re-optimization may include reduced set of decision variables, objectives, and/or constraints. The input parameters 110 may indicate procedures and mechanisms for performing any re-optimizations that may be performed by the MOEA system 130.

The models 120 may include objective model(s) that may be used by the MOEA system 130 to evaluate chromosomes based at least in part on performance on one or more objectives for which the optimization is performed. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like.

The models 120 may further include one or more constraint model(s) that may be used to determine if a particular chromosome violates a constraint associated with each of the one or more constraint model(s). These constraints may pertain to physical limitations in implementing a particular potential solution. For example, if a chromosome associated with a flight schedule optimization problem is such that a particular airplane is to depart at a time prior to the airplane finishing its previous flight, then such an implementation may perform well from the standpoint of various objectives, but may never be physically implementable. In example embodiments, the constraint models may provide value(s)

for any variety of constraints that may be violated by a chromosome or potential solution to the optimization problem. For example, with pricing optimization problems, the constraint model(s) may indicate if a number of sales at an optimized price and if that number of sales causing a constraint violation for being too high or too low. In this example, the predicted sales for a particular price of a product (e.g., where the price of the product is a gene in a chromosome being evaluated), as determined using the constraint models, may be provided for use in an MOEA process, such as in performing non-domination ranking and/or selection. In example embodiments, one or more of the constraints may be designated, such as by an operator of the optimization, as soft constraints. In these example embodiments, one or more of the constraints may be designated, such as by an operator of the optimization, as hard constraints. In accordance with example embodiments, a chromosome that violates a hard constraint may be deemed hard infeasible and a chromosome that violates only soft constraint(s) may be deemed soft infeasible. A chromosome that does not violate any constraints may be deemed feasible.

As shown, the result of optimization based on the input parameters 110 and by using the models 120, outputs 140 may be generated by the MOEA system 130. The outputs may be one or more variables (e.g., decision variables arranged as an array or genes arranged as a chromosome) that are optimized in accordance with the models 120 by the MOEA system 130. For example, in a pricing optimization problem, the outputs 140 may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. This is by way of example only and it will be appreciated that, in example embodiments, there may be more than four items to be priced. For example, a world-wide hotel chain may wish to price its rental rooms across all of its worldwide properties. In such an example, constraints may arise from the hotel chain, at least in the short run, having a fixed number of hotel rooms. As another example, an airline may wish to price all flights that it has on its network (e.g., 2000 daily sorties), including multi-leg flights. In such an example, constraints may arise from the airline, at least in the short run, having a fixed number of available seats for each seating class between any two cities. As yet another example, a consumer electronics company may wish to price its entire range of notebook computers, tablet computers, and smartphones with various trims and options. In such an example, constraints may arise from the consumer electronics company, at least in the short run, having a fixed manufacturing capacity across its line of products in shared manufacturing assets (e.g., factories).

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOEA system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

Figure 2:
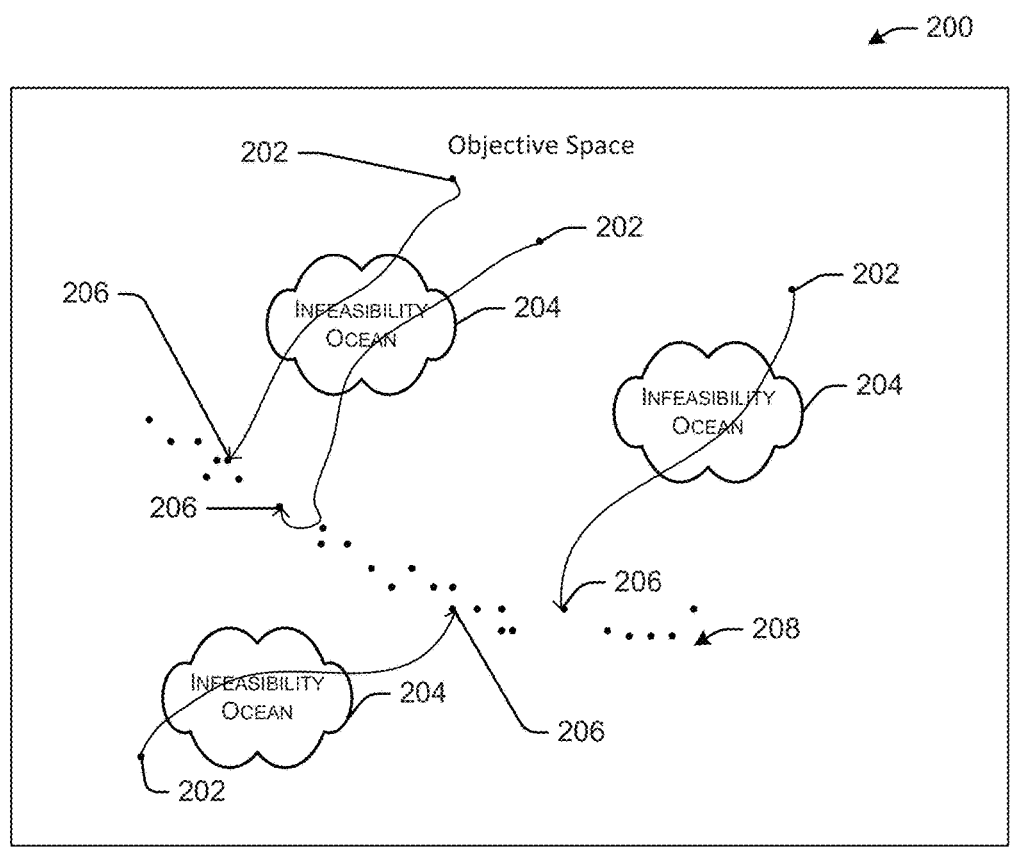
FIG. 2 is a chart that illustrates an example progression to pareto-optimized solutions traversing infeasibility oceans in objective space, in accordance with embodiments of the disclosure.

FIG. 2 is a chart that illustrates an example progression to pareto-optimized solutions 208 traversing infeasibility oceans 204 in objective space 200, in accordance with embodiments of the disclosure. Although this objective space 200 is depicted as two dimensional, it will be appreciated that there may be any number of dimensions in the objective space, corresponding to the number of multiple objectives for which optimization is performed. Indeed, in some examples the objective space may be hyper-dimensional (e.g., greater than three-dimensional). In some cases, such as relatively highly constraint optimization problems, there may be relatively significant portions of infeasible space 204, such as depicted in this multi-objective space 200 for the particular optimization problem of FIG. 2. It will be appreciated that decision variable space may correspond to objective space 200, as depicted. In other words, there may be a mapping between a multi-dimensional set of decision variables and their corresponding multiple objectives (e.g., objectives for the optimization).

When there are relatively large and/or contiguous portions of infeasible objective space, it may be difficult and/or time-consuming for potential solutions 202 or initial chromosomes 202 to generate chromosomes that progress towards a pareto-front 208. This may be because infeasible chromosomes may be filtered out of the population and, therefore, a pathway through infeasible space 204 may be unlikely. However, by retaining and allowing to persist some infeasible solutions, such as soft-infeasible chromosomes, as described herein, it may be possible to traverse even relatively large and/or contiguous oceans of infeasible space 204, starting from initial chromosomes 202 to pareto-optimized solutions 206 along a pareto-front 208. It will then be appreciated that there may, in some cases, be a benefit in more rapidly arriving at a pareto-optimized solution 206 by, at least temporarily, retaining and/or propagating some infeasible chromosomes.

Figure 3:
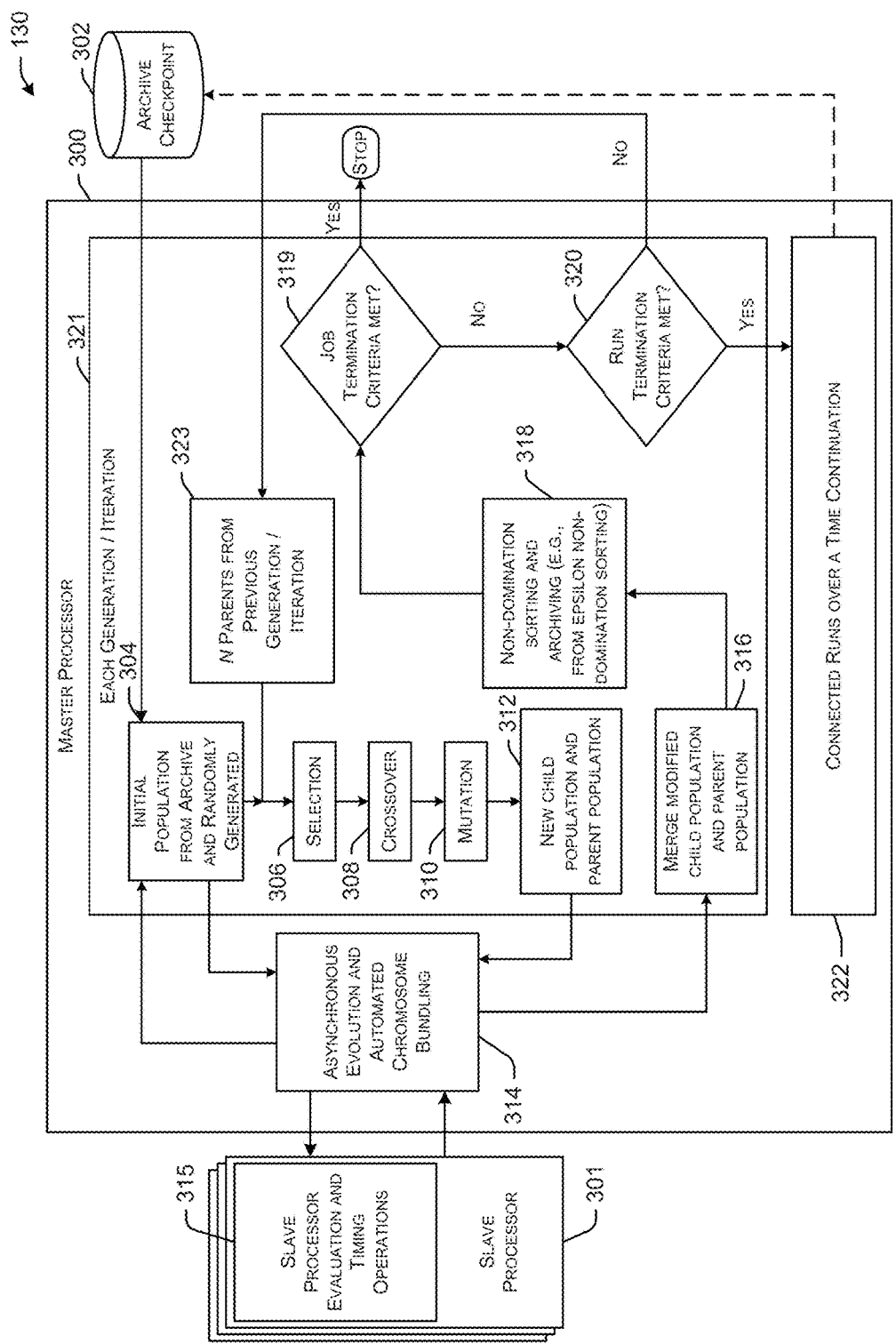
FIG. 3 is a block diagram that illustrates an example multi-objective evolutionary algorithm system with soft constraints of FIG. 1, in accordance with embodiments of the disclosure.

FIG. 3 is a block diagram that illustrates an example multi-objective evolutionary algorithm system 130 with soft constraints of FIG. 1, in accordance with embodiments of the disclosure. In some example embodiments, the MOEA system 130 may be an evolutionary algorithm system, such as those described in at least U.S. Pat. Nos. 8,255,344 and 8,285,653, both of which are incorporated herein, in their entirety by reference.

The evolutionary algorithm system 130 may employ techniques of biologic natural selection to efficiently search a multi-objective optimization space that may not be amenable to search by analytic, iterative, or other methods. In example embodiments, the search variables, such as the prices of various items in a pricing problem, may be organized as a data structure that resembles genes in a chromosome.

Upon organizing the search variables, the evolutionary algorithm may proceed to generate child chromosomes from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items) from any given generation, based at least in part on the corresponding respective performance on the multiple objectives that are being used to evaluate the optimization problem (e.g., pricing optimization). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes selecting a relatively optimized solution set (i.e. optimized launch parameters) in accordance with the identified objectives of the optimization. When new child solutions are generated using the biological-styled processes described above, a check for feasibility may be performed.

In accordance with example embodiments, a check for feasibility may generate three separate classes of feasibility of the chromosomes that are tested for constraint violations. Chromosomes that do not display any constraint violations may be classified as feasible solutions. Such a classification may further indicate that the solution as embodied in that feasible chromosome may be physically implementable by entities controlling the physical elements and/or systems being optimized for performance according to multiple objectives. As discussed above, one or more of the constraints may be deemed soft constraints and the remainder of the constraints may be deemed hard constraints. If a chromosome violates only soft constraints, as determined by the one or more constraint models 120, then that chromosome may be deemed soft infeasible. If a chromosome violates one or more hard constraints, then the chromosome may be deemed hard infeasible. A soft infeasible chromosome may be allowed, at least for a limited number of generations to survive from one generation to the next, and depending on the overall population of chromosomes, allowed to propagate (e.g., produce offspring chromosomes) over more than one generation. On the other hand, hard infeasible chromosomes may not be allowed be archived between runs of the multi-objective optimization. Thus, hard infeasible chromosomes may be allowed to persist in the overall population of chromosomes that are allowed to propagate for one or more generations, only if there are not enough feasible chromosomes or soft infeasible chromosomes that are allowed to persist from one generation to the next within a run of the multi-objective optimization. In other words, if there is a predetermined number of chromosomes that are allowed to persist from one generation to the next, only when there are not a sufficient number of feasible of soft infeasible chromosomes up to the predetermined number of chromosomes that are allowed to persist from one generation to the next, will hard infeasible chromosomes be propagated to subsequent generations. Thus, it will be appreciated that a hard infeasible chromosome will survive for fewer generations than a feasible chromosome or a soft infeasible chromosome, and may not persist from one run to the next.

In example embodiments, when non-domination sorting (e.g., for determining which chromosomes to retain in the population, as stored in an archival database, into the next generation or performing a selection process), to determine which chromosomes to cross-over, the various classes of constraint violations and infeasibility may be considered. In example embodiments, the feasible chromosomes may always dominate (e.g., outrank or outperform) either of soft infeasible or hard infeasible chromosomes. In these example embodiments, soft infeasible chromosomes may dominate hard infeasible chromosomes. Further in these example embodiments, a soft infeasible chromosome may be non-domination tested against another soft infeasible chromosome, in some example embodiments, based at least in part on soft constraint values of each of the soft infeasible chromosomes and not objective values of those soft infeasible chromosomes. In other example embodiments, the non-domination testing of two soft-infeasible chromosomes may be based at least in part on both soft constraint values, as well as objective values of each of the soft-infeasible chromosomes. In these example embodiments, a two-process test may be performed in some aspects, where domination is determined first by comparing (e.g, non-domination sorting based thereon) soft constraint values and then by comparing objective values. In further aspects, a two-step test may be performed where domination is determined first by comparing objective values and then by constraint values. In yet further aspects, a domination may be determined based at least in part on comparing a combination (e.g., in accordance with each constraint metric and objective metric, analytical combination, linear combination, etc.) of the constraint values and the objective values of the two soft infeasible chromosomes. Further still, in these example embodiments, hard-infeasible chromosomes may be non-domination tested with another hard infeasible chromosome based at least in part on hard constraint values of each of the hard infeasible chromosomes. Feasible chromosomes may be non-domination tested against other feasible chromosomes based at least in part on objective values (e.g., multiple objective values) of each of the chromosomes.

It can be seen that the mechanisms used by the evolutionary algorithm (e.g., genetic operators, selection, cross-over, mutation, etc.), particularly in the form of an evolutionary algorithm system 130, are not mechanisms that are limited to arrive at a convergence in an iterative fashion. Indeed, the mechanism is one that employs intelligent "hopping around" and evaluating according to optimization objectives, rather than a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the evolutionary algorithm system 130, as described herein. Although the MOEA system 130 is discussed herein in the context of an evolutionary algorithm system, it will be appreciated that the MOEA system 130 may be any suitable system for implementing a heuristic optimization, such as, but not limited to Monte Carlo methods, external optimization (EO) methods, etc.

In this example embodiment, the MOEA system 130 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., initial set of prices that may be allocated to one or more hotel room types, initial flight schedules, initial set of manufacturing parameters). In other words, in some example embodiments, the initial population may represent a starting point, such as a best guess or a set of parameters that may represent the current implementation prior to the benefits of the optimization(s), as described herein. In an example embodiment of the disclosure, each parent chromosome data structure (e.g., prices for items in a pricing problem) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In an example embodiment of the disclosure, the initial population of parent chromosome data structures may be obtained from a combination of an archive checkpoint 302 and random generation of new chromosome data structures. An archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system.

The archive checkpoint 302 may include an elite set of chromosome data structures (i.e., elite solutions of problem to be optimized) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions.

In example embodiments, the archive checkpoint 302 may include feasible chromosomes that may persist (e.g., such as chromosomes deemed an elite set) from one generation to the next. In other words, a non-domination test may be used to determine that a particular feasible solution should persist to the next generation. When evaluating feasible solutions for the persistence storage at the archive checkpoint 302, associated objective values may be considered. Feasible chromosomes may be compared to other feasible chromosomes based at least in part on performance of the feasible chromosomes associated with each of the multiple objectives, as determined by the objective models 120. The archive checkpoint 302, in example embodiments, may further include soft-infeasible chromosomes. These soft infeasible chromosomes may be included, in example embodiments, when the full population to be carried to the next generation 321 is not fully populated with feasible solutions. In this way, if the soft infeasible solutions contain favorable genetic material from a multi-objective standpoint, the soft infeasible solutions may persist from one generation to the next 321 in the archive checkpoint 302, even if the soft infeasible chromosomes do not meet all constraints of the optimization problem. Soft infeasible chromosomes may be compared (non-domination tested) to other soft infeasible chromosomes based on soft constraint values (e.g., how badly does the soft infeasible chromosome violate one or more soft constraints). In example embodiments, hard infeasible solutions may not persist from one run to the next. These hard infeasible solutions may not be stored in the archive checkpoint 302 in these example embodiments.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 314, which allocates the chromosomes to the slave processors 301 for objective function evaluation and/or constraint function evaluation by block 315. Once the objective function evaluation in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures of optimized parameters. In an example embodiment of the disclosure, the selection of the pairs of parent chromosome optimized parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

It will be appreciated that the chromosomes selected from each tournament may be feasible or soft infeasible. In other example embodiments, the chromosomes selected may further include hard infeasible chromosomes. In example embodiments, the winners of a tournament may be determined based at least in part on the status of the chromosome as feasible, soft infeasible, or hard infeasible. In example embodiments, the feasible chromosomes may always dominate the infeasible chromosomes (e.g., soft infeasible or hard infeasible chromosomes). In further example embodiments, soft infeasible chromosomes may always dominate hard infeasible chromosomes. In these and other example embodiments, constraint values may further be considered in selecting a winning chromosome among the tournament participating chromosomes. For example, when selecting from multiple soft infeasible chromosomes, performance on the soft constraints may be considered in selecting the non-dominated chromosome. Similarly, when selecting from multiple hard infeasible chromosomes, performance on the hard constraints may be considered in selecting the non-dominated chromosome. Further still, objective values may be considered in the selection process 306. In example embodiments, when selecting from multiple feasible chromosomes, the performance of those chromosomes on the multiple objectives of the optimization may be considered for the purposes of determining tournament winner(s) (e.g., non-dominated solutions).

Following block 306, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 308 and 310. For example, block 308 illustrates a crossover evolutionary operator in which a portion of the parameter values or "gene" values (e.g. individual launch parameters of a satellite of the satellite constellation under design, flight schedules of an airline, prices of airline tickets, manufacturing parameters in a factory, etc.) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

After the evolutionary operations of block 306, 308, and 310, a new population of child chromosome data structures may be obtained in block 312. Following block 312, processing may proceed to block 314. In block 314, the new population of child chromosome data structures may be received into a "To Evaluate" list or queue. Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. Alternatively, the slave processor 301 may receive a fixed number of chromosome data structures in a chromosome bundle, but simply receive a larger number of chromosome bundles within a predetermined amount of time. The example automated chromosome bundling process may allow efficient allocation of chromosome data structures among the plurality of slave processors 301. In some cases, the number of flags, indicating the number of genes that are permitted to be considered as deviating from the baseline solution chromosome, may be considered in the bundling process.

In block 315, each slave processor 301 may have received a chromosome bundle comprising one or more chromosome data structures from the master processor 300. Additionally, in certain embodiments, the slave processors 301 may further receive a baseline chromosome or solution organized in any manner, representing a known solution. The slave processors 301 may be homogenous or heterogeneous in processing capability. Each slave processor 301 may evaluate, in accordance with a plurality of objective functions, the received chromosome bundle of chromosome data structures, and/or the baseline solution chromosome to generate a plurality of respective objective function values for each chromosome data structure in block 315. In some example embodiments, the slave processors 301 may further perform the functions of constraint minimization. The slave processors 301, therefore, in example embodiments, receive a solution to be both constraint minimization driving, in addition to objective value determination. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values, constraint function values, etc.) and timing data (e.g., wait times and/or objective function evaluation times and/or constraint function evaluation times) to the master processor 300.

The slave processor 301 may further receive, in some example embodiments, a constraint violated solution and return a constraint non-violated solution to the master processor 300. In other words, in these particular embodiments, a constraint minimization engine may be implemented on the slave processors 301. An example of a constraint minimization engine is discussed elsewhere, such as in at least U.S. Pat. Nos. 8,494,988 and 8,285,653, both of which are incorporated herein, in their entirety by reference. In some of these example embodiments, the slave processors 301 may further provide objective values, as determined using the objective models 120, along with the non-constraint solutions and/or solutions with reduced constraints. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In example embodiments, the processes of block 315 may provide constraint values and/or determination of feasibility of chromosomes evaluated at the slave processors 301. The chromosomes may be deemed feasible (e.g., if no constraint functions are violated), soft infeasible (e.g., if only soft constraint functions are violated), or hard infeasible (e.g., if any hard constraint functions are violated). Constraint values may also be provided for each of the chromosomes that are evaluated. For example, soft constraint values may be determined and returned to the master processor 300 for chromosomes that violate only soft constraints and hard constraint values may be determined and returned for chromosomes that violate hard constraints.

In block 316, the master processor 300 may receive a modified child population of chromosome data structures from the asynchronous evolution process of block 314. In certain embodiments, the modified child population may include different chromosome structures as well as a different number of chromosome data structures as compared to the child population of block 312. The received modified child population is merged with the current parent population, as illustrated by block 316. In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to example embodiments, non-domination sorting may utilize the concept of domination to compare solutions provided by the merged list of child and parent chromosome data structures. A solution $x_1$ (e.g., chromosome $x_1$) is said to dominate solution $x_2$ (e.g., chromosome $x_2$) if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

According to example embodiments, non-domination sorting may utilize constraint values, rather than and/or in addition to objective value(s), as determined for chromosomes being evaluated. A solution $x_1$ is said to dominate solution $x_2$ if both conditions 1 and 2 identified below are true:

Condition 1: The solution $x_1$ is no worse than $x_2$ in all constraints.

Condition 2: The solution $x_1$ is strictly better than $x_2$ in at least one constraint.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$ Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 302 or another archive of a computer memory or other data storage for subsequent retrieval. At this point, the solutions (e.g., chromosomes), as stored in the checkpoint 302, may be generated based at least in part on objective function based evaluation and/or constraint function based evaluation.

Following processing in block 318, processing may proceed to block 319. In block 319, a determination is made as to whether the current job is completed such that the evolutionary algorithm should be terminated. A job typically comprises processing involving a plurality of connected runs 322, where each run 322 may include processing associated with one or more generations/iterations 321. Block 319 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 319 determines that the job is not complete, then processing may proceed to block 320 to determine whether the current run 322 has completed. In determining whether the current run is complete, block 320 may determine whether a current run 322 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 320 determines that a current run 322 is not complete, then processing may proceed to block 323, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 320 may determine that a current run 322 is complete. For example, looking back over a predetermined number of generations, the search may have failed to produce improvement in the solutions during each generation/iteration 321 of the current run 322. Improvement may be based upon the quantity of the solutions (e.g., the number of solutions) and the quality of the solutions (e.g., some quantification of distance from a utopia point, box fitness, etc.). In this case, the current run 322 may be completed, and processing proceeds to initiate a subsequent run 322. The subsequent run 322 may generate an initial population by invigorating the elite solutions stored in the archive checkpoint 302. In particular, the subsequent run 322 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. The randomly generated parent chromosome data structures may be generated and evaluated using the example processes discussed with respect to blocks 304 and 314.

In some example embodiments, the processors 300, 301 of the multi-tiered optimization system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-tiered optimization system 130 may also include a chipset (not shown) for controlling communication between the one or more processors 300, 301 and one or more of the other components of the s multi-tiered optimization system 130. The one or more processors 300, 301 may also include one or more application specific integrated circuits (ASICs) or application specific standard products (ASSPs) for handling specific data processing functions or tasks. In example embodiments, the multi-tiered optimization system 130 may further include input/output (I/O) device(s) such as display screen(s), touch sensitive display screen(s), speaker(s), haptic device(s), or the like, may be controlled via one or more I/O device interfaces.

The multi-tiered optimization system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the MOEA system 130 may be optimized for multiple objectives, while being viable and/or feasible (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
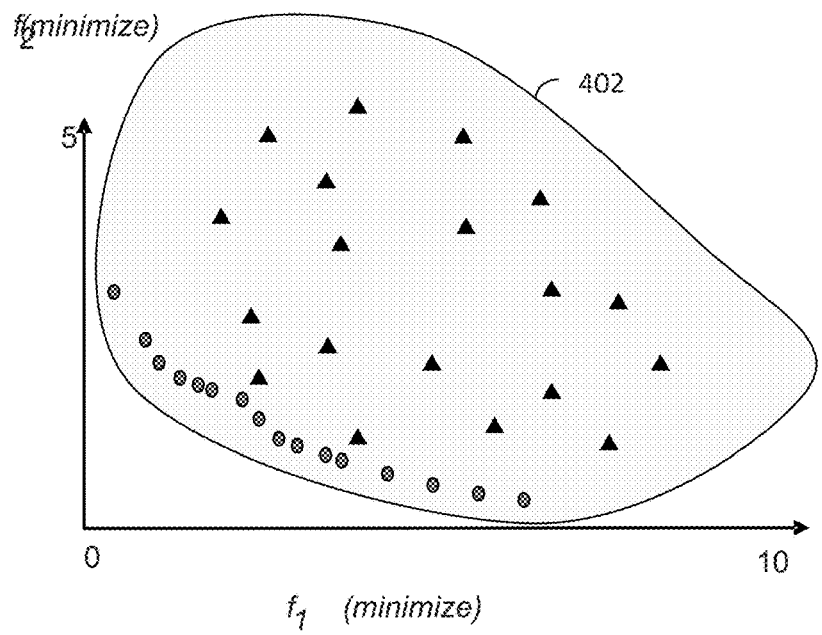
FIGS. 4A and 4B are charts illustrating an example pareto-optimized solution to a multi-objective problem, in accordance with embodiments of the disclosure.
Figure 4B:
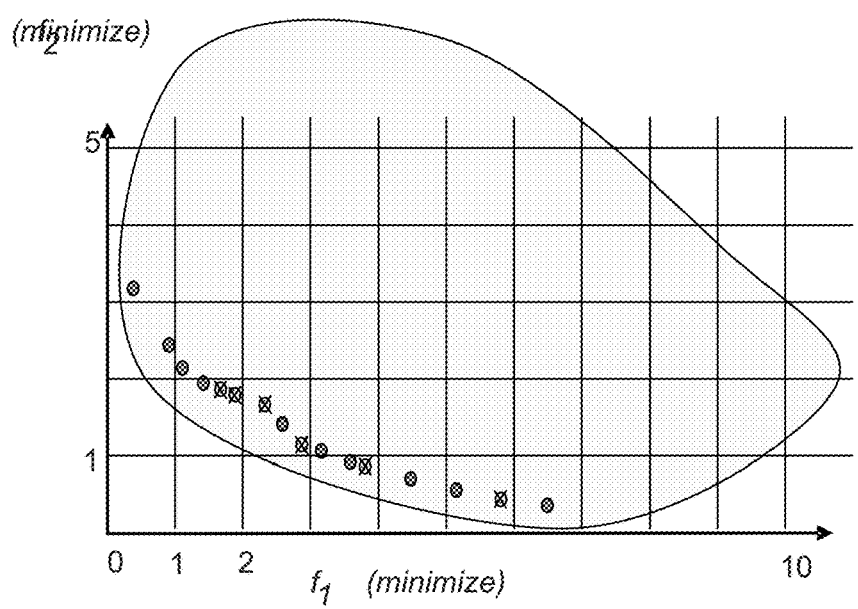

FIGS. 4A and 4B are charts illustrating an example pareto-optimized solution to a multi-objective problem, in accordance with embodiments of the disclosure. Initially, a first non-domination sorting may be applied to the current population 402 to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function and a second epsilon value may be associated with second epsilon spacing or step size $\varepsilon_2$ associated with objective function $f_2$. Each solution may then be associated with an epsilon vector or epsilon box address $(\varepsilon_1, \varepsilon_2)$ corresponding to the first epsilon value and the second epsilon value. If two or more solutions have the same epsilon box address, then the epsilon non-domination sorting may retain a single solution per epsilon box address $(\varepsilon_1, \varepsilon_2)$. This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

It will be appreciated that within an epsilon box (e.g., a box in a hyperdimensional sense), there may be a utopia corner, or otherwise a corner that may be better performing from a multi-objective standpoint, than other locations of the epsilon box. In some example embodiments, a single solution or a subset of all the solutions within a particular epsilon box may be retained for each epsilon box. Thus, in example embodiments, a pareto-front may include a single (or a predetermined number) solution within one or more epsilon boxes, where the epsilon boxes are non-dominated by each of the other epsilon boxes. In some example embodiments, the single solution may be selected by determining a distance to the utopia corner of the epsilon box. For example, if there are multiple potential chromosomes in a particular epsilon box, the chromosome that is least distal from the utopia corner may be retained. This distance determination (e.g., Euclidean distance, cosine distance, etc.) mechanism for selecting the retained chromosome may be applied to either feasible solutions or soft infeasible solutions. Alternatively, in some example embodiments, non-domination sorting using the objective values of either the feasible solutions or the soft-constraint solutions may be performed to identify chromosomes within an epsilon box to retain. It will be appreciated when using non-domination sorting within the epsilon box that multiple solutions may be retained and that solutions with the best objective value for any particular objective will not be pruned. In other words, non-dominated chromosomes within an epsilon box may be retained in these example embodiments.

In still further example embodiments, other mechanisms may be employed for the purposes of determining which chromosome(s) to retain within each of the epsilon boxes at, or in proximity of, the best-known pareto-front. Other techniques may include determining a Euclidean distance to the sweet spot of the epsilon box for each of the chromosome(s) with a particular epsilon box. From this a thresholding mechanism may be used to select the chromosomes with the particular epsilon box to retain. Alternatively, a predetermined number of the most proximal chromosome(s) to the sweet spot of the epsilon box may be retained. Other example embodiments may include performing a non-domination sorting with only a subset of the objectives to identify the chromosome(s) to retain within a particular epsilon box. Further still, in other example embodiments, a gradient-descent mechanism using all or a subset of objectives may be used to select the chromosome(s) to retain within a particular epsilon box. In yet further example embodiments, a single (or predetermined number of) chromosome that displays the best performance according to each of the objectives of the multi-objectives may be retained within an epsilon box. In additional example embodiments, the determination of which chromosome(s) to preserve within an epsilon box may be based at least in part on a determination of which chromosomes provide the greatest genetic diversity. For example, the chromosome that is closest to the sweet spot of the epsilon box (e.g., such as determined by Euclidean distance) may be preserved. Then a cross-correlation (e.g., a weighted cross-correlation) of all of the genes of each of the chromosomes to the first retained chromosome within the epsilon box may be performed to determine which of the other chromosomes provide the greatest genetic diversity. It will be appreciated that there may be any number of mechanisms, including any combinations of the aforementioned mechanisms, to identify a plurality of chromosome(s) that may be retained within a particular epsilon box. It will further be appreciated that a relatively greater quantity of relatively high quality genetic information may be preserved in a population if there is an allowance for propagating more than one chromosome from one generation to the next.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region 402 associated with a first objective function $f_1$ and a second objective function $f_2$. Within the feasible design region is a snapshot of a population of solutions of a given generation/iteration, according to an example embodiment of the invention. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 5:
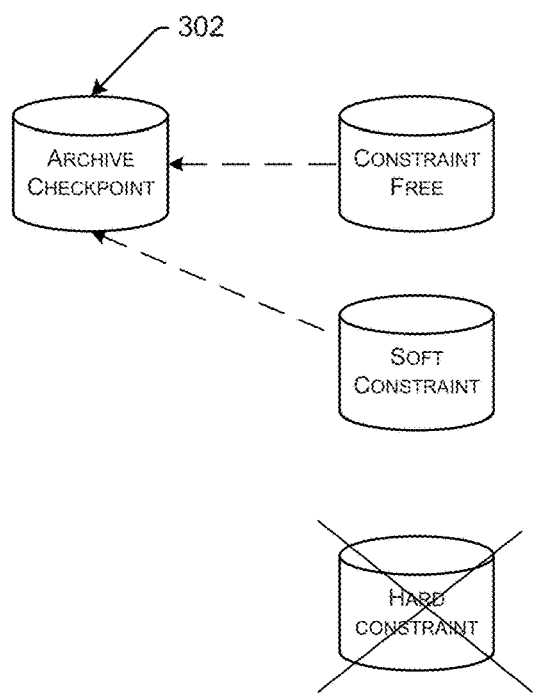
FIG. 5 is a schematic diagram that illustrates an example contents of an archive checkpoint of the multi-objective evolutionary algorithm system of FIGS. 1 and 3, in accordance with embodiments of the disclosure.

FIG. 5 is a schematic diagram that illustrates an example contents of an archive checkpoint of the multi-objective evolutionary algorithm system of FIGS. 1 and 3, in accordance with embodiments of the disclosure. As discussed above, such as in conjunction with the discussion of the MOEA system 130, as depicted in FIG. 3, elite chromosomes that are to persist from one generation 321 to the next 321 of a series of connected runs 322 may be stored and/or archived at archive checkpoint 302. In example embodiments, not all chromosomes may be allowed to persist from one generation 321 to subsequent generations 321. Accordingly, not all chromosomes may be eligible to be stored in the archive checkpoint 302. In example embodiments, as depicted, only feasible chromosomes and soft infeasible chromosomes may be stored in the archive checkpoint 302. In other words, in these example embodiments, hard infeasible chromosomes may not be stored in the archive checkpoint. As discussed above, hard and soft infeasibility may be determined based on which constraints have been designated, such as by an operator of the optimization, as either a soft constraint or a hard constraint.

As a non-limiting example, consider that a first, second, and third set of constraints are declared soft and a fourth and fifth set of constraints are declared hard, such as in an input file, then a set of chromosomes may be evaluated according to these soft and hard constraints. If a first chromosome violates only the first and third constraints, but none of the other constraints of this example, then that chromosome may be deemed soft infeasible. If a second chromosome violates the first and fourth constraints, then that second chromosome may be deemed hard infeasible. If a third chromosome violates the fifth constraint, then that fifth chromosome may be deemed hard infeasible. If a fourth chromosome violates none of the constraints of this example, then that chromosome may be declared feasible. If a fifth chromosome violates the second constraint of this example, then that fifth chromosome may be deemed soft infeasible. In example embodiments, the fourth chromosome, along with the first chromosome and the fifth chromosome may be stored in the archive checkpoint 302 and allowed to participate in selection processes 306 in subsequent generation(s).

Figure 6:
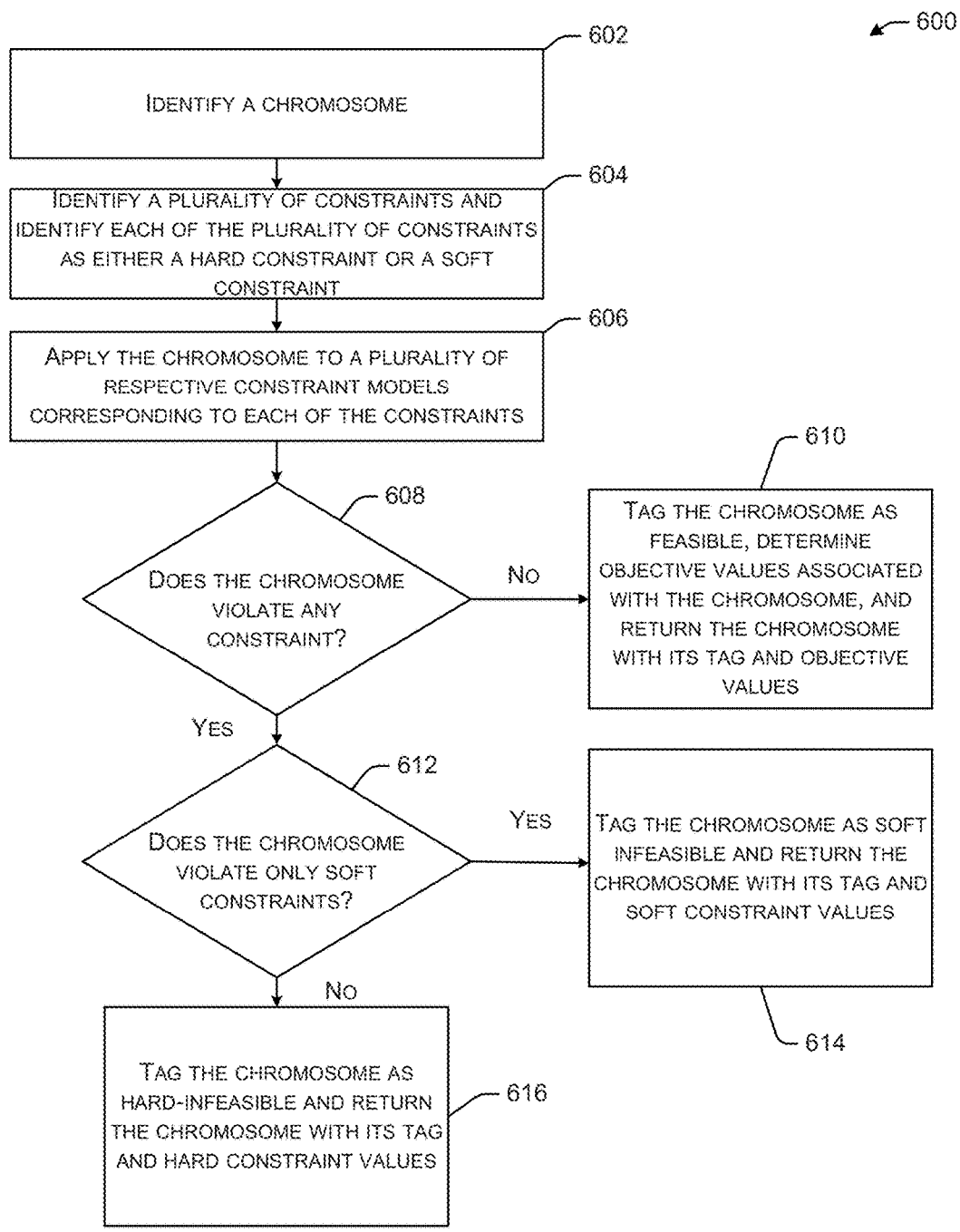
FIG. 6 is a flow diagram that illustrates an example method performed by the slave processors of FIG. 3 in determining various types of constraint violations of chromosomes, in accordance with embodiments of the disclosure.

FIG. 6 is a flow diagram that illustrates an example method 600 performed by the slave processors of FIG. 3 in determining various types of constraint violations of chromosomes, in accordance with embodiments of the disclosure. The processes of method 600 may be performed by the slave processors 301, in example embodiments. At block 602, a chromosome may be identified. This chromosome may be a chromosome to be evaluated for constraints and/or objective values and received by the slave processors 301 from the master processor 300 after the processes of blocks 312 and 314, as described in conjunction with FIG. 3.

At block 604, a plurality of constraints may be identified and each of the plurality of constraints may be identified as either a hard constraint or soft constraint. The designation as a hard constraint or soft constraint, in example embodiments, may be user defined, such as by an operator that initiates and/or runs the optimization on the MOEA system 130. In some example embodiments, the soft and hard designations of the constraints may be defined in an input file.

At block 606, the chromosome may be applied to a plurality of respective constraint models corresponding to each of the constraints. In this case, there may be constraint models for the hard constraints and constraint models for the soft constraints. Each of the constraint models may be specified as inputs to the MOEA system 130. The constraint models may, in example embodiments, may provide values associated with the constraint. Therefore, by applying the chromosome to each of the constraint models, constraint values for each of the constraints may be determined. Furthermore, the constraint value for each of the constraint models may be thresholded against a predetermined threshold to determine in a constraint (e.g., soft constraint or hard constraint) has been violated.

At block 608, it may be determined if the chromosome violates any constraint. This may be determined by thresholding constraint values against corresponding threshold values. If it is determined that the chromosome does not violate any constraints, then at block 610, the chromosome may be tagged as being feasible (e.g., no constraints are violated) and objective values of the multiple objectives may be determined and the chromosome may be returned with its tag and objective values. Tagging the feasible chromosome may entail any suitable mechanism for indicating that the chromosome is feasible, such as by setting a flag indicating the same, appending and/or cataloging metadata indicating the same, or the like.

If, however, at block 608, it is determined that the chromosome has violated one or more constraints, then at block 612, it may be determined if the chromosome only violated soft constraints. This may be determined by identifying if the constraint violations of the chromosome are only soft constraints, as identified during the processes of block 604. If it is determined that the chromosome only violates soft constraints, then at block 614 and the chromosome may be returned with its tag and soft constraint values. Tagging the soft infeasible chromosome may entail any suitable mechanism for indicating that the chromosome is soft infeasible, such as by setting a flag indicating the same, appending and/or cataloging metadata indicating the same, or the like. If however, at block 612, it is determined that the chromosome violates at least one hard constraint, then at block 616, the chromosome may be tagged as hard infeasible and the chromosome may be returned with its tag and hard constraint values. Again, tagging the hard infeasible chromosome may entail any suitable mechanism for indicating that the chromosome is hard infeasible, such as by setting a flag indicating the same, appending and/or cataloging metadata indicating the same, or the like.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
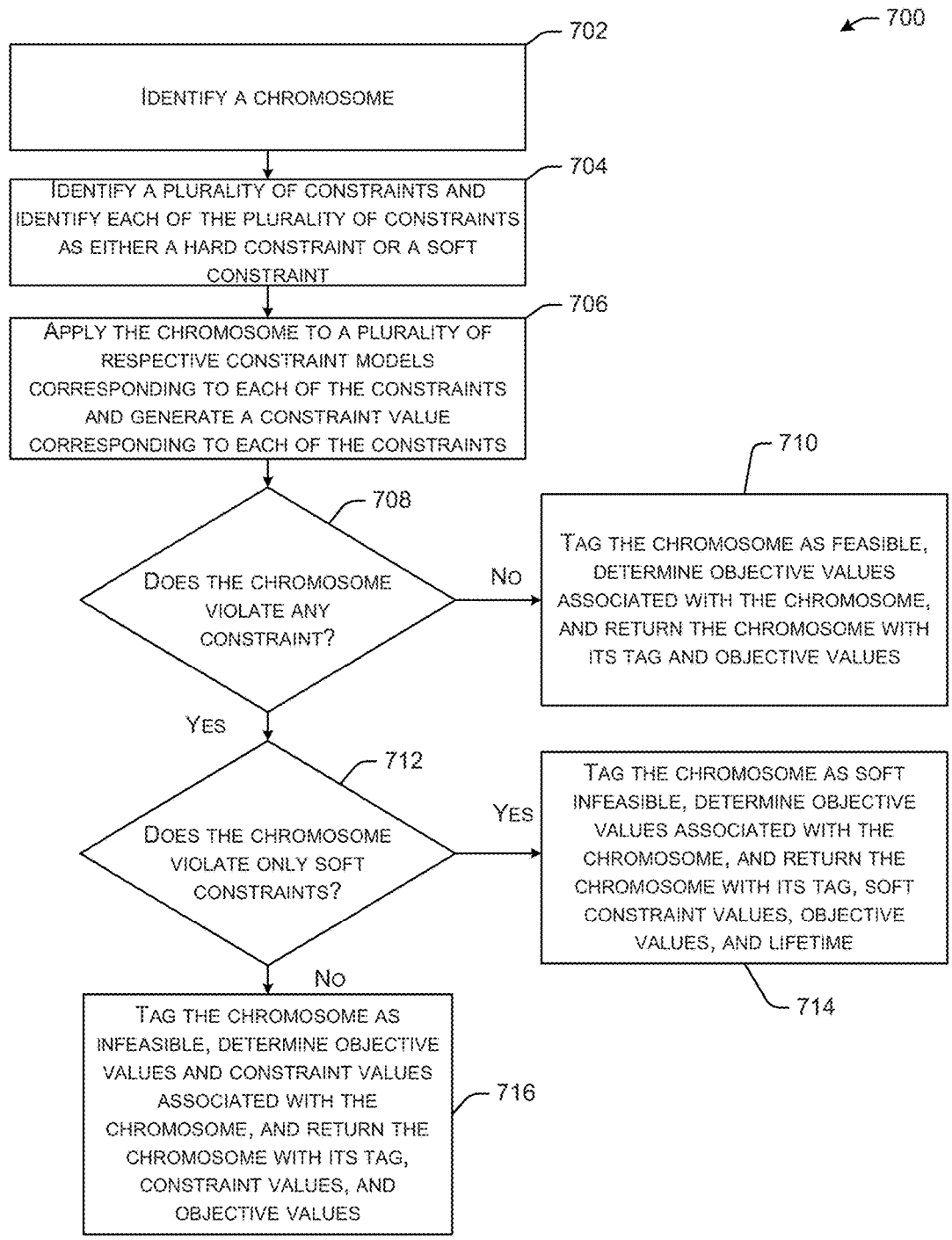
FIG. 7 is a flow diagram that illustrates an example method performed by the slave processors of FIG. 3 in determining various types of constraint violations of chromosomes, in accordance with embodiments of the disclosure.

FIG. 7 is a flow diagram that illustrates an example method performed by the slave processors of FIG. 3 in determining various types of constraint violations of chromosomes, in accordance with embodiments of the disclosure. The processes of method 700 may be performed by the slave processors 301, in example embodiments. The processes of method 700 may be similar to corresponding processes of method 600 of FIG. 6. In method 700, in addition to providing soft constraint values when returning a chromosome tagged soft infeasible, a lifetime may be provided for the soft infeasible chromosome. This lifetime may indicate how long (e.g., how many generations) the soft infeasible chromosome may persist in the population as archived in the archive checkpoint 302. In some case, multi-objective values may also be provided (e.g., returned to the master processor 300) for the soft infeasible and/or hard infeasible chromosomes.

At block 702, a chromosome may be identified. This chromosome may be a chromosome to be evaluated for constraints and/or objective values and received by the slave processors 301 from the master processor 300 after the processes of blocks 312 and 314, as described in conjunction with FIG. 3.

At block 704, a plurality of constraints may be identified and each of the plurality of constraints may be identified as either a hard constrain or soft constraint. The designation as a hard constrain or soft constraint, in example embodiments, may be user defined, such as by an operator that initiates and/or runs the optimization on the MOEA system 130. In some example embodiments, the soft and hard designations of the constraints may be defined in an input file.

At block 706, the chromosome may be applied to a plurality of respective constraint models corresponding to each of the constraints to generate a constraint value corresponding to each of the constraints. In this case, there may be constraint models for the hard constraints and constraint models for the soft constraints. Each of the constraint models may be specified as input models 120 to the MOEA system 130. The constraint models may, in example embodiments, may provide values associated with the constraint. Therefore, by applying the chromosome to each of the constraint models, constraint values for each of the constraints may be determined. Furthermore, the constraint value for each of the constraint models may be thresholded against a predetermined threshold to determine in a constraint (e.g., soft constraint or hard constraint) has been violated.

At block 708, it may be determined if the chromosome violates any constraint. This may be determined by thresholding constraint values against corresponding threshold values. If it is determined that the chromosome does not violate any constraints, then at block 710, the chromosome may be tagged as being feasible (e.g., no constraints are violated) and objective values of the multiple objectives may be determined and the chromosome may be returned with its tag and objective values.

If, however, at block 708, it is determined that the chromosome has violated one or more constraints, then at block 712, it may be determined if the chromosome only violated soft constraints. This may be determined by identifying if the constraint violations of the chromosome are only soft constraints, as identified during the processes of block 704. If it is determined that the chromosome only violates soft constraints, then at block 714, the chromosome may be tagged as soft infeasible, objective values may be determined, and the chromosome may be returned with its tag, soft constraint values, objective values, and lifetime. The lifetime may indicate the amount of time that the soft infeasible chromosome is to persist (e.g., number of maximum generations that the soft infeasible chromosome is to live among the population). If however, at block 712, it is determined that the chromosome violates at least one hard constraint, then at block 716, the chromosome may be tagged as hard infeasible and the chromosome may be returned with its tag and hard constraint values. Thus it is seen that objective values may be determined for only the soft infeasible and feasible chromosomes, and not the hard infeasible chromosomes.

It will be appreciated that in these example embodiments, objective values may be returned for soft infeasible and/or hard infeasible chromosomes. In some example embodiments, non-domination sorting and/or tournament selection may use the objective values in addition to constraint values in selecting a tournament winner. For example, a weighted mixture of constraint values and objective values may be used to identify a tournament winner among two or more soft infeasible chromosomes. As another example, objective values may be used as a tie-breaker when constraint values do not indicate a winner, or a clear and dominant winner in some cases.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
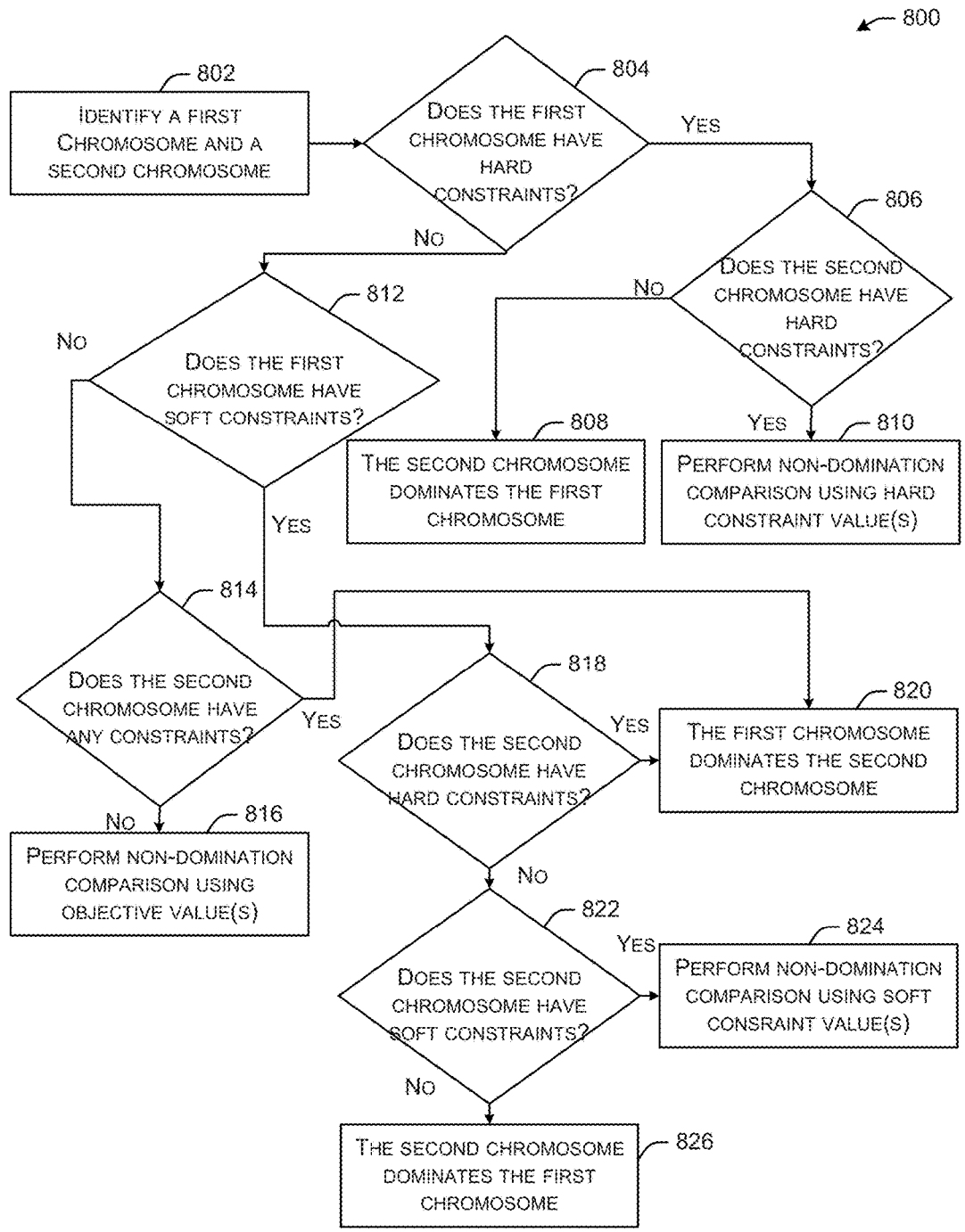
FIG. 8 is a flow diagram that illustrates an example method for non-domination sorting with chromosomes that may have three different levels of constraint violations for one or both of non-domination sorting and archiving and/or selection processes, in accordance with embodiments of the disclosure.

FIG. 8 is a flow diagram that illustrates an example method 800 for non-domination sorting with chromosomes that may have three different levels of constraint violations for one or both of non-domination sorting and archiving and/or selection processes, in accordance with embodiments of the disclosure. The non-domination sorting, as described herein, may be performed at the selection block 306 and/or the non-domination sorting block 318, as described in conjunction with FIG. 3. At block 802, a first chromosome and a second chromosome may be identified. The first chromosome and the second chromosome may be subjected to a tournament selection process based at least in part on the feasibility state (e.g., feasible, soft infeasible, or hard infeasible) of the first and second chromosomes, constraint values of the first and second chromosomes, and/or the multi-objective values of the first and second chromosomes.

At block 804, it may be determined if the first chromosome has any hard constraints (e.g., is the first chromosome hard infeasible?). This may be determined by the tag associated with the chromosome, as discussed in reference to FIGS. 6 and 7. If it is determined that the first chromosome does have hard constraints, then at block 806, it may be determined if the second chromosome has hard constraints. If the second chromosome does not have hard constraints, then it may be determined, at block 808, that the second chromosome dominates the first chromosome. On the other hand, if at block 806, it is determined that the second chromosome does have hard constraints, then, at block 810, non-domination comparison may be performed using hard constraint value(s). In this case, tournament selection between the two hard infeasible chromosomes may be based at least in part on comparing hard constraint values. The chromosome that is non-dominated (e.g., is no worse on the basis of one or more hard constraints (i.e., at last equally constraint), and is less constraint with respect to at least one of the hard constraints.

At block 804, if it was determined that the first chromosome does not have any hard constraints, then at block 812, it may be determined if the first chromosome has any soft constraints. This may be determined based at least in part on how the first chromosome is tagged, as received from the slave processors 301. If the first chromosome is tagged as soft infeasible, it may indicate that the first chromosome violates at least one soft constraint and no hard constraints. If it is determined that the first chromosome does not have soft chromosomes, at block 814, it may be determined if the second chromosome has any constraint violations (e.g., hard constrain violations or soft constraint violations). If at block 814, it is determined that the second chromosome does have constraint violations, then, at block 820, the first chromosome may dominate the second chromosome. At block 814, if it is determined that the second chromosome does not have any constraints, then at block 816, non-domination comparison using objective value(s) may be performed between the two feasible chromosomes (i.e., the first chromosome and the second chromosome).

At block 812, if it was found that the first chromosome does, indeed, have soft constraints, then the method 800 may proceed to block 818, where it may be determined if the second chromosome has hard constraints. If it is determined that the second chromosome does have hard constraints, then, at block 820, it may be determined that the first chromosome dominates the second chromosome. If, however, at block 818, it is found that the second chromosome does not have hard constraints, then at block 822, it may be determined if the second chromosome has any soft constraints. If it is determined that the second chromosome does have soft constraints, then at block 824, non-domination comparison using soft constraint value(s) may be performed. If, on the other hand, it is determined that the second chromosome does not have soft-constraints, then at block 826, the second constraint, as a feasible constraint, may dominate the first chromosome.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   identifying, by one or more processors, a first chromosome, wherein the first chromosome includes a plurality of decision variables to be optimized in a multi-objective optimization;
   identifying, by the one or more processors, a first constraint model corresponding to a first constraint and a second constraint model corresponding to a second constraint;
   identifying, by the one or more processors, the first constraint as a hard-constraint and the second constraint as a soft constraint;
   applying, by the one or more processors, the first constraint model to the first chromosome to derive a first constraint value;
   applying, by the one or more processors, the second constraint model to the first chromosome to derive a second constraint value;
   comparing, by the one or more processors, the first constraint value to a corresponding first threshold value to determine that the first chromosome does not violate the first constraint;
   comparing, by the one or more processors, the second constraint value to a corresponding second threshold value to determine that the first chromosome does violate the second constraint;
   indicating, by the one or more processors, that the first chromosome is soft infeasible, wherein a tag of soft infeasible indicates that only soft constraints have been violated;
   determining, based at least in part on the second constraint value, that the first chromosome is to be crossed-over with a second chromosome;
   generating a third chromosome by crossing over the first chromosome with the second chromosome;
   determining, based at least in part on the first constraint model and the second constraint model, that the third chromosome is feasible; and
   providing the third chromosome as an optimized solution to the multi-objective optimization.

2. The method of claim 1, further comprising:
identifying, by the one or more processors, a fourth chromosome;
determining, by the one or more processors, that the fourth chromosome is soft infeasible;
identifying, by the one or more processors, a third constraint value corresponding to the second constraint and the fourth chromosome; and
comparing, by the one or more processors, the third constraint value to the second constraint value,
determining, by the one or more processors and based at least in part on the comparison of the third constraint value to the second constraint value, that the first chromosome dominates the fourth chromosome.

3. The method of claim 2, further comprising:
determining, by the one or more processors, a first set of objective values by applying one or more objective models to the first chromosome;
determining, by the one or more processors, a second set of objective values by applying the one or more objective models to the fourth chromosome,
wherein determining that the first chromosome dominates the fourth chromosome further comprises comparing the first set of objective values to the second set of objective values.

4. The method of claim 1, wherein the first chromosome is stored in an archive checkpoint.

5. The method of claim 1, further comprising:
identifying, by the one or more processors, a fourth chromosome;
applying, by the one or more processors, the first constraint model to the fourth chromosome to derive a third constraint value;
comparing, by the one or more processors, the third constraint value to the corresponding first threshold value to determine that the fourth chromosome violates the first constraint; and
indicating, by the one or more processors, that the fourth chromosome is hard infeasible, wherein a tag of hard infeasible indicates that at least one hard constraint has been violated.

6. The method of claim 5, further comprising determining that the first chromosome dominates the fourth chromosome based at least in part on the soft infeasible tag of the first chromosome and the hard infeasible tag of the fourth chromosome.

7. The method of claim 1, further comprising:
identifying, by the one or more processors, a fourth chromosome;
applying, by the one or more processors, the first constraint model to the fourth chromosome to derive a third constraint value;
applying, by the one or more processors, the second constraint model to the fourth chromosome to derive a fourth constraint value;
comparing, by the one or more processors, the third constraint value to the corresponding first threshold value to determine that the fourth chromosome does not violate the first constraint and comparing the fourth constraint value to the corresponding second threshold value to determine that the fourth chromosome does not violate the second constraint; and
indicating, by the one or more processors, that the fourth chromosome is feasible, wherein a tag of feasible indicates that the fourth chromosome does not violate any constraints.

8. The method of claim 7, further comprising determining that the fourth chromosome dominates the first chromosome based at least in part on the soft infeasible tag of the first chromosome and the feasible tag of the second chromosome.

9. The method of claim 7, further comprising:
determining, by the one or more processors, a set of objective values by applying one or more objective models to the fourth chromosome.

10. The method of claim 9, wherein the set of objective values is a first set of objective values and further comprising:
identifying, by the one or more processors, that a fifth chromosome is feasible;
determining, by the one or more processors, a second set of objective values corresponding to the fifth chromosome based at least in part on applying the one or more objective models to the fifth chromosome; and
determining, by the one or more processors, that the fifth chromosome dominates the second chromosome, based at least in part on the first set of objective values and the fourth set of objective values.

11. A system, comprising:
a memory that stores computer-executable instructions;
at least one processor configured to access the memory, wherein the at least one processor is further configured to execute the computer-executable instructions to:
identify a first chromosome, wherein the first chromosome includes a plurality of decision variables to be optimized in a multi-objective optimization;
identify a first constraint model corresponding to a first constraint and a second constraint model corresponding to a second constraint;
identify the first constraint as a hard-constraint and the second constraint as a soft constraint;
apply the first constraint model to the first chromosome to derive a first constraint value;
apply the second constraint model to the first chromosome to derive a second constraint value;
compare the first constraint value to a corresponding first threshold value to determine that the first chromosome does not violate the first constraint;
compare the second constraint value to a corresponding second threshold value to determine that the first chromosome does violate the second constraint;
indicate that the first chromosome is soft infeasible, wherein a tag of soft infeasible indicates that only soft constraints have been violated;
determine, based at least in part on the second constraint value, that the first chromosome is to be crossed-over with a second chromosome;
generate a third chromosome by crossing over the first chromosome with the second chromosome;
determine, based at least in part on the first constraint model and the second constraint model, that the third chromosome is feasible; and
provide the third chromosome as an optimized solution to the multi-objective optimization.

12. The system of claim 11, wherein the at least one processor is further configured to execute the computer-executable instructions to:
identify a fourth chromosome;
determine that the fourth chromosome is soft infeasible;
identify a third constraint value corresponding to the second constraint and the fourth chromosome; and compare the third constraint value to the second constraint value to determine that the first chromosome is not dominated by the fourth chromosome.

13. The system of claim 11, wherein the first chromosome is stored in an archive checkpoint.

14. The system of claim 11, wherein the at least one processor is further configured to execute the computer-executable instructions to:
identify that the first chromosome and the fourth chromosome are in the same epsilon box;
perform an analysis to determine that both the first chromosome and the fourth chromosome are to be stored in an archive checkpoint, wherein the analysis comprises at least one of: (i) a non-domination sorting between the first chromosome and the fourth chromosome, (ii) a determination of a Euclidean distance for each of the first chromosome and the fourth chromosome, (iii) a non-domination sorting between the first chromosome and the fourth chromosome using reduced sets of objective metrics, (iv) a determination of a best performing chromosome for each objective metric, or (v) a determination of the genetic diversity of the first chromosome and the fourth chromosome;
store, based at least in part on the analysis, both the first chromosome and the fourth chromosome in the archive checkpoint.

15. The system of claim 14, wherein the at least one processor is further configured to execute the computer-executable instructions to:
identify a fourth chromosome;
apply the first constraint model to the fourth chromosome to derive a third constraint value;
compare the third constraint value to the corresponding first threshold value to determine that the fourth chromosome violates the first constraint; and
indicate that the fourth chromosome is hard infeasible, wherein a tag of hard infeasible indicates that at least one hard constraint has been violated.

16. The system of claim 15, wherein the at least one processor is further configured to execute the computer-executable instructions to determine that the first chromosome dominates the fourth chromosome based at least in part on the soft infeasible tag of the first chromosome and the hard infeasible tag of the fourth chromosome.

17. The system of claim 11, wherein the at least one processor is further configured to execute the computer-executable instructions to:
identify a fourth chromosome;
apply the first constraint model to the fourth chromosome to derive a third constraint value;
apply the second constraint model to the fourth chromosome to derive a fourth constraint value;
compare the third constraint value to the corresponding first threshold value to determine that the fourth chromosome does not violate the first constraint and compare the fourth constraint value to the corresponding second threshold value to determine that the fourth chromosome does not violate the second constraint; and
indicate that the fourth chromosome is feasible, wherein a tag of feasible indicates that the fourth chromosome does not violate any constraints.

18. The system of claim 17, wherein the at least one processor is further configured to execute the computer-executable instructions to determine that the fourth chromosome dominates the first chromosome based at least in part on the soft infeasible tag of the first chromosome and the feasible tag of the second chromosome.

19. The system of claim 17, wherein the at least one processor is further configured to execute the computer-executable instructions to determine a set of objective values by applying one or more objective models to the fourth chromosome.

20. The system of claim 19, wherein the set of objective values is a first set of objective values and wherein the at least one processor is further configured to:
identify that a fifth chromosome is feasible;
determine a second set of objective values corresponding to the fifth chromosome based at least in part on applying the one or more objective models to the fifth chromosome; and
determine that the fifth chromosome dominates the fourth chromosome, based at least in part on the first set of objective values and the second set of objective values.

* * * * *